United States Patent
Ahmed

(10) Patent No.: US 10,824,120 B2
(45) Date of Patent: Nov. 3, 2020

(54) DIAGNOSTICS IN BUILDING AUTOMATION

(71) Applicant: Siemens Industry, Inc., Alpharetta, GA (US)

(72) Inventor: Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 697 days.

(21) Appl. No.: 15/549,629

(22) PCT Filed: Feb. 29, 2016

(86) PCT No.: PCT/US2016/020068
§ 371 (c)(1),
(2) Date: Aug. 8, 2017

(87) PCT Pub. No.: WO2016/144591
PCT Pub. Date: Sep. 15, 2016

(65) Prior Publication Data
US 2018/0046173 A1 Feb. 15, 2018

Related U.S. Application Data

(60) Provisional application No. 62/131,749, filed on Mar. 11, 2015.

(51) Int. Cl.
*G06N 20/00* (2019.01)
*G05B 13/02* (2006.01)
(Continued)

(52) U.S. Cl.
CPC .......... *G05B 13/0265* (2013.01); *F24F 11/30* (2018.01); *F24F 11/62* (2018.01);
(Continued)

(58) Field of Classification Search
CPC ...................................................... G06N 20/00
(Continued)

(56) References Cited

U.S. PATENT DOCUMENTS 9,092,802 B1 * 7/2015 Akella .................... G06F 40/30
9,251,472 B1 * 2/2016 Linowes ............ G05D 23/1923
(Continued)

FOREIGN PATENT DOCUMENTS

CN 103399239 11/2013
CN 103718546 4/2014

OTHER PUBLICATIONS

PCT Search Report dated Jun. 16, 2016, for PCT Application No. PCT/US2016/020068, 10 pages.
(Continued)

*Primary Examiner* — David R Vincent

(57) ABSTRACT

Using data from various sources, clustering or other unsupervised learning determines a relationship of the data to performance. Meta data or business data different than building automation data is used to diagnose building automation. Relationships of building automation to the meta or business data are determined with clustering or other case-based reasoning. For multiple building situations, clustering with or without the meta data identifies poor performing buildings, equipment, automation control, or enterprise function.

20 Claims, 7 Drawing Sheets

(51) Int. Cl.
| | |
|---|---|
| *G05B 15/02* | (2006.01) |
| *G06Q 10/04* | (2012.01) |
| *F24F 11/30* | (2018.01) |
| *G05B 23/02* | (2006.01) |
| *F24F 11/62* | (2018.01) |
| *G06Q 10/10* | (2012.01) |
| *G06Q 50/16* | (2012.01) |
| *F24F 11/52* | (2018.01) |
| *F24F 11/32* | (2018.01) |
| *F24F 11/63* | (2018.01) |

(52) U.S. Cl.
CPC ........... *G05B 13/026* (2013.01); *G05B 15/02* (2013.01); *G05B 23/0229* (2013.01); *G06N 20/00* (2019.01); *G06Q 10/04* (2013.01); *G06Q 10/10* (2013.01); *F24F 11/32* (2018.01); *F24F 11/52* (2018.01); *F24F 11/63* (2018.01); *G05B 2219/25011* (2013.01); *G06Q 50/163* (2013.01); *Y02P 80/10* (2015.11)

(58) Field of Classification Search
USPC ..................................................... 706/15, 45
See application file for complete search history.

(56) References Cited

U.S. PATENT DOCUMENTS

| | | | |
|---|---|---|---|
| 2011/0166913 | A1 | 7/2011 | Buchanan |
| 2011/0231320 | A1* | 9/2011 | Irving ................... G06Q 30/00 705/80 |
| 2013/0030875 | A1 | 1/2013 | Lee et al. |
| 2014/0245071 | A1 | 8/2014 | Drees et al. |
| 2015/0046233 | A1 | 2/2015 | Srulowitz et al. |
| 2015/0154353 | A1* | 6/2015 | Xiang ................... G16B 40/00 706/12 |
| 2015/0168003 | A1* | 6/2015 | Stefanski ................. F24F 11/70 165/237 |
| 2016/0018835 | A1* | 1/2016 | Gaasch ..................... G05F 1/66 700/291 |
| 2016/0364313 | A1* | 12/2016 | Roth ................... G06F 11/3058 |

OTHER PUBLICATIONS

Fan, Cheng et al: "A framework for knowledge discovery in massive building automation data and its application in building diagnostics"; Automation in Construction; vol. 50; 2015; Feb. 1, 2015; URL: http://dx.doi.org/10.1016/j.autcon.2014, 10 pages.
Chinese Search Report dated Apr. 23, 2020, for CN Application No. 2016800135472, 10 pages.

* cited by examiner

DIAGNOSTICS IN BUILDING AUTOMATION

RELATED APPLICATION

This patent document is a 35 U.S.C. § 371 National Stage application of and claims priority and all other benefits from PCT Application No. PCT/US2016/020068, titled "Diagnostics in Building Automation," filed Feb. 29, 2016. The entire content of the foregoing PCT application is hereby incorporated by reference to the extent permitted by law.

TECHNICAL FIELD

The present embodiments relate generally to building automation systems.

BACKGROUND

Building automation systems include heating, ventilation and air conditioning (HVAC) systems, security systems, fire systems, or other systems. The systems are typically formed from distributed components wired together. HVAC systems may be formed with one, two or three separate tiers or architectural levels. In a three tier system, a floor level network provides general control for a particular floor or zone of a building. Controllers of the floor level network provide process controls based on sensor inputs to operate actuators. For example, an adjustment of a damper, heating element, cooling element, or other actuator is determined based on a set point and a measured temperature. Other control functions may be provided. The building level network integrates multiple floor level networks to provide consistent control between various zones within a building. Panels or other controllers control distribution systems, such as pumps, fans or other central plants for cooling and heating. Building level controllers may communicate among themselves and access floor level controllers for obtaining data. The management level network integrates control of the building level networks to provide a high-level control process of the overall building environment and equipment.

Each building is run separately. Data from the different levels is used to identify faults or diagnose problems for a given building. This data for a given building may not accurately reflect a problem or the influence of the building automation on a business.

SUMMARY

Using data from various sources, clustering or other unsupervised learning determines a relationship of the data to performance. Meta data or business data different than building automation data is used to diagnose building automation. Relationships of building automation to the meta or business data are determined with clustering or other case-based reasoning. For multiple building situations, clustering with or without the meta data identifies poor performing buildings, equipment, automation control, or enterprise function.

In one aspect, a method of building automation diagnosis in a building management system is provided. First data related to a plurality of buildings of the building management system is accessed. The first data includes building management system data and enterprise data different than building management system data. The enterprise data for an enterprise is associated with the buildings of the plurality, and the building management system data is for the buildings of the plurality. The first data is applied to unsupervised machine learning with a measure of performance of the building management system. Because of the applying, at least one component of the first data indicative of poorer measures of the performance is output. The at least one component includes the enterprise data.

In a second aspect, a system is provided for building automation diagnosis. Building automation systems for heating, ventilation, and air conditioning are provided for multiple buildings and are configured to output operational data. A processor is configured to cluster the operational data of the building automation systems and to identify a sub-set of the building automation systems based on the cluster. A display is configured to output the identification of the sub-set.

In a third aspect, a method is provided for building automation diagnosis in a building management system. Enterprise data in an enterprise database of the building management system is accessed. The enterprise data relates to one or more buildings. The enterprise data is other than building management system data. Performance of a building management system is clustered with the enterprise data. Results of the clustering are presented on a display.

Other systems, methods, and/or features of the present embodiments will become apparent to one with skill in the art upon examination of the following FIGS. and detailed description. It is intended that all such additional systems, methods, features, and advantages be included within this description, be within the scope of the invention, and be protected by the accompanying claims. Additional features of the disclosed embodiments are described in, and will be apparent from, the following detailed description and the FIGS.

BRIEF DESCRIPTION OF THE FIGURES

The components in the FIGS. are not necessarily to scale, emphasis instead being placed upon illustrating the principles of the embodiments. In the FIGS., like reference numerals designate corresponding parts throughout the different views.

DETAILED DESCRIPTION

Figure 1:
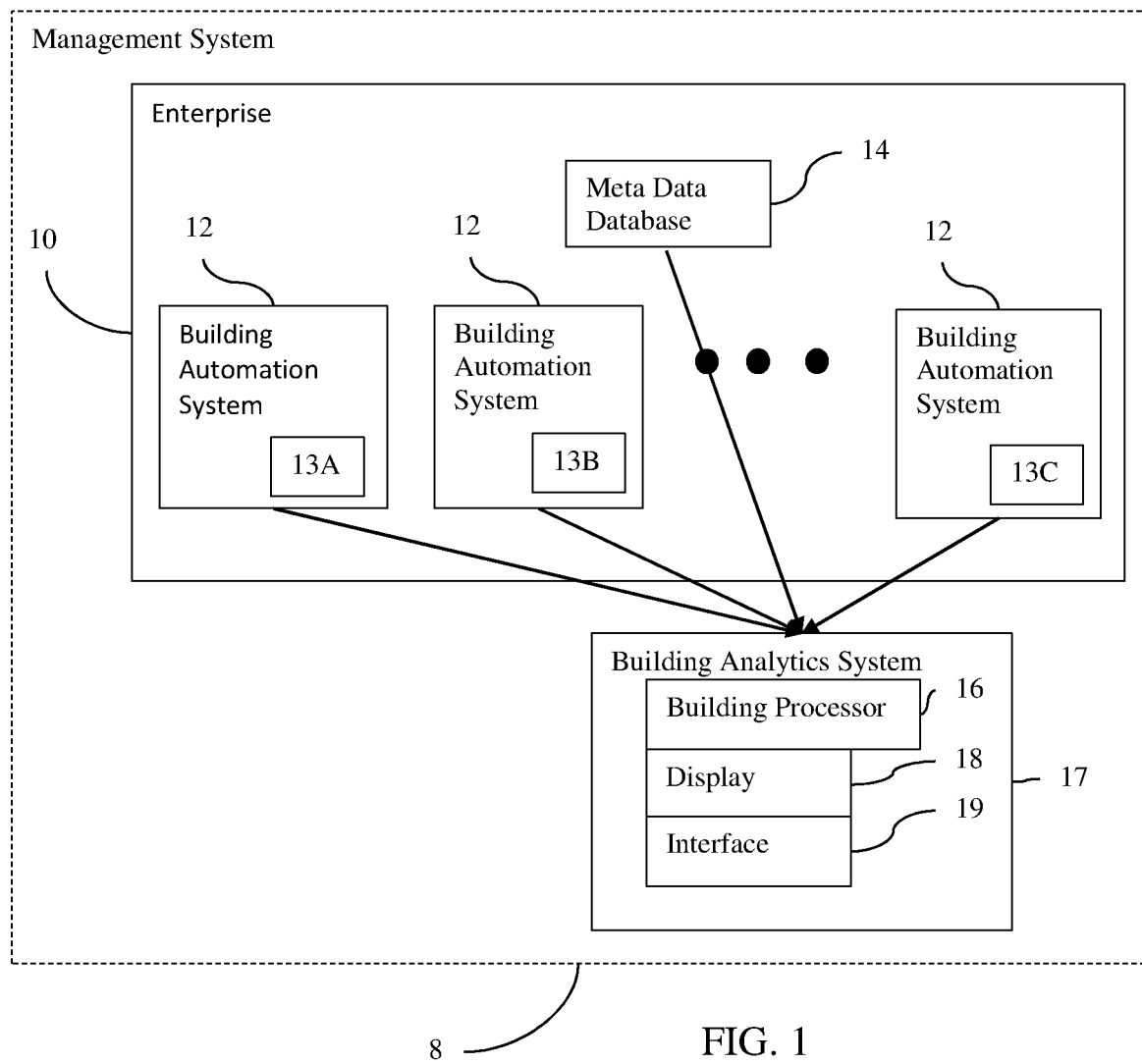
FIG. 1 is a block diagram of one embodiment of a management system for building automation diagnosis within an enterprise.

Analytics are used in building automation. Embodiments disclosed herein provide improvements for building automation systems employing analytics. Analytics is the systematic use of physical data and related business insights developed through applied analytical disciplines (e.g. statistical, contextual, quantitative, predictive, cognitive, or other emerging models) to drive fact-based decision making for planning, management, measurement, and learning. Analytics may be descriptive, predictive, or prescriptive. For a non-building automation system example, a system may use Twitter® data to accurately predict rates of heart disease by region (e.g., county). The data analytics from twitter information mirrors heart disease rates from death certificates.

For building automation, performance analytics are applied within a single building and all its systems. Big data analytics are applied across multiple buildings that belong to and/or are controlled by a given enterprise. For example, the operation of tens or hundreds of branches, franchises, or facilities are analyzed. The analytics are designed to detect operational performance deficiency, such as fault detection and diagnostics—proactively and adaptively. At an enterprise level, performance analytics of a particular building automation system and big data analytics of the enterprise in which the building automation systems are employed are combined by a management system operable to analyze and perform processes based on the combination as further described herein.

Customers or others using data analytics in building automation may benefit. A management system employing the analytics processes and structures as described herein may be used to provide quality safe, comfortable, and productive environment. Service interruptions, breakdowns, and turndown time may be reduced. Cost of ownership may be reduced, and equipment and/or systems service life may be increased. By analyzing at an enterprise level in accordance with processes employed in the embodiments of management systems disclosed herein, the focus for an enterprise or company shifts from repair and maintenance to prevention and prediction. Overall operating expense, operating expenditure, operational expense, operational expenditure (OPEX) may be reduced, allowing better utilization of capital expenditure (CAPEX).

Using unsupervised machine learning, data from multiple buildings and/or meta data from the enterprise are used to diagnose building automation or management system operation and/or enterprise function related to building automation. For example, the locations of buildings are correlated with performance of one or more components of an HVAC system. The clustering or case based reasoning employed in the embodiments disclosed herein identifies commonalities among the lower performance buildings. These commonalities may be used to correct the operation or the building automation at those buildings. This may reduce cost as compared to a fix for all buildings.

FIG. 1 shows one embodiment of a management system 8 for building automation diagnosis. The system implements the method of FIG. 11. Other methods may be implemented. The system uses big data in the form of data from many buildings or independently operating automation systems and/or in the form of meta, business, or other enterprise data not used in the control or operation of the automation systems employed in the buildings. By clustering or applying case-based reasoning, the management system 8 is able to perform unsupervised learning that indicates relationships (e.g., level of correlation) between different variables and the performance or the automation and/or enterprise.

The management system 8 includes an enterprise 10 associated with any number of building automation systems 12 and a meta data database 14. A computer or building analytics system 17 with a processor 16 and display 18 are part of the enterprise 10 or separate from the enterprise 10. Additional, different, or fewer components may be provided. For example, the building analytics system 17 may include a keyboard or mouse (not shown in the figures) that is operatively connected to the processor 16 via an interface 19 for receiving user inputs. The interface 19 may also include a network communications interface for enabling the processor 16 to communicate with building automation systems 12 and meta database 14.

The enterprise 10 is a company, organization, collective, or individual using an automated facility or building for business activities other than the automation of the facility. Building automation includes safety (e.g., fire alarm), environmental (e.g., HVAC), security, hazard, combinations thereof or other building systems. These automated building systems provide a space for conducting business. The business is provided for other purposes than automating the building, such as sales of products or services. The enterprise 10 is in business for providing products or services, but operates in one or multiple buildings with automation. For example, a bank has hundreds of buildings for branches and/or headquarters. The enterprise 10 provides banking services and the enterprise 10 is housed in buildings.

The enterprise 10 generates information or data. The data is business data, such as for the sales, service, human resources, information technology of operation of networks different than the building automation, accounting, budgets, or other business data. This business data is enterprise 10 level meta data different than data generated as part of or for operation of the building automation systems 12.

The enterprise or meta data is stored in a meta data database 14. The database 14 is one or more memories, such as hard drives, flash drives, tape drives, or other database. The database 14 is operated as one memory or multiple separate memories to store the various meta data.

Example meta data includes employee or student performance, such as test scores or review ratings. Other meta data may be budgets, employee attendance, staffing level, maintenance schedule or information, sales, elevator usage, or other data at the enterprise level. While the data is generated as part of the enterprise, the granularity of the data may be by regions, employee, or even building.

The building automation systems 12 includes safety (e.g., fire alarm), environmental (e.g., HVAC), security, hazard, combinations thereof, or other building systems. The automation is of a building, floor, room, or zone hosting part of the enterprise 10. In the example of FIG. 1, many (e.g., two or more, tens, or hundreds) of separate building automation systems 12 are provided. Each or some of the building automation system 12 operate independently of the others. Some buildings may be operated dependently, such as where a plant or distribution is shared. Other buildings are automated independently, such as where the buildings are in different blocks, zip codes, cities, counties, states, and/or countries. A same system (e.g., HVAC) may be in different buildings and may be controlled using the same automation system 12, but the sensors and actuators of one building are controlled separately than another building. For example, a restaurant or bank may have a same building design, so use the same design of a building automation system 12 for many different buildings. Despite these similarities, the operation of each building automation system 12 is independent as some buildings are in regions with different temperatures at a given time.

A given instance of a building automation system generates data, such as data from sensors, actuators, panels, or controllers. Sensors may include temperature, humidity, fire, smoke, occupancy, air quality, gas, $CO_2$ or CO, or other now known or later developed sensors, such as an oxygen sensor for use in hospitals. Actuator may include a valve, relay, solenoid, speaker, bell, switch, motor, motor starter, damper, pneumatic device, combinations thereof, or other now known or later developed actuating devices for building automation. The controllers or panels interact with other building automation devices for establishing, setting, altering, instructing, reporting, or routing information for controlling building automation functions. The controller is a panel, processor, workstation, and/or server.

Control processes are run on controllers, sensors, and actuators as appropriate for the particular operations of each device. The sensor reports information appropriate or specific to the sensor, such as reporting the result of a comparison of a measured value to a desired or set point value. Actuators use the output sensor data to provide a response appropriate for the actuator. Controllers monitor the process or action of sensors and actuators without control in one mode of operation. In another mode of operation, the controllers override or influence the sensor and/or actuators to alter processing based on a regional or larger area control process. For example, a controller implements a coordination control application for overriding, setting, adjusting or altering the operation of another building automation application. Alternatively, the controllers run processes to measure deviation from a set point and control the response.

Other building automation devices may include personal computers, panels, or monitors. For example, one building automation device is an actuator for controlling a building wide component, such as a chiller, boiler, building intake vent, or building airflow out take vent. Using the building automation devices, major or building wide equipment, individual spaces, or local input and output points are controlled. The sensors, actuators, and/or control may be for zones, rooms, distribution, and/or plant operation.

The building automation system 12 implements building automation applications for controlling building functions. The building automation applications are programmed with programmable powerful processing control language (PPCL) or other language.

Figure 2:
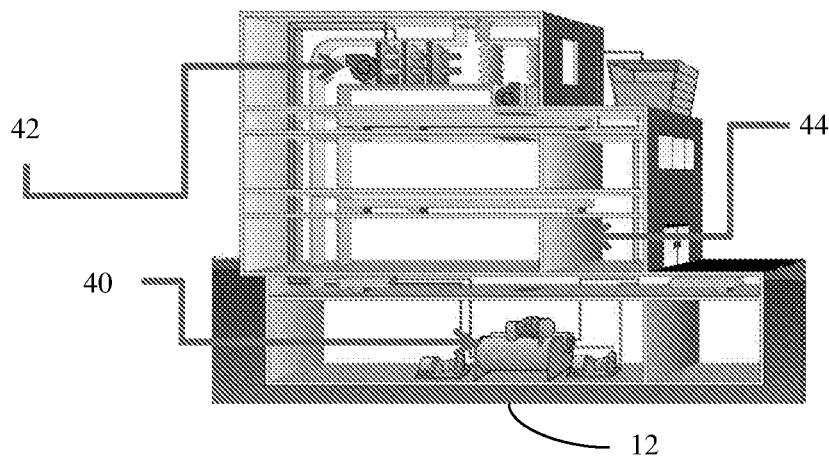
FIG. 2 illustrates an example building automation system that may be employed in the management system.

The building automation systems 12 are configured by software and/or hardware to collect, store and output operational data 13a, 13b, and/or 13c in FIG. 1. For a given building, operational data is used to measure performance and/or to control the automation of the respective building. The data may be management data, such as logging changes and flagged errors. Report data may be output. Other operational data includes measures from sensors, actuator settings, set points, warnings, or other data generated in the operation of the building automation system 12. As represented in FIG. 2, each building automation system 12 may generate operational data from zones or rooms 44, distribution system 42 (e.g., air handling units), and/or one or more plants 40 (e.g., water or air cooled chiller, furnace, or broiler) employed in the building in which the building automation system 12 operates.

This building management data, such as building operational data, is specific to the building automation system 12, so is different than the meta data stored in the database 14. The database 14 may also store the building operation data, or the building operation data is stored in other memories.

The building automation systems 12 store the operational data for access in response to a query. Alternatively, the building automation systems 12 push data to the processor 16 of the building analytics system 17 or another device. The interface 19 of the building analytics system or computer 17 accesses the meta data database and/or the building automation systems 12 to pull or collect data. Alternatively, the data is periodically pushed to the interface 19 by the respective building automation system 12.

The operational data 13 and/or enterprise data (such as meta data 14 for the enterprise 10) are communicated using wired or wireless communications. A local area, wide area, Internet, or other computer network may be used to communicate the operational data to the processor 16. For within the building automaton system 12, the same or different network is used, such as an 802.15.4 network, token network, or Mesh network. Bluetooth, Wi-Fi, computer network, Ethernet, proprietary, or other standard communication protocols may be used. 802.15.4 and 802.11x provide medium access control and a physical interface to a wireless medium. Any now known or later developed network and transport algorithms may be used.

Any packet size or data format may be used. Different bandwidths for any given communications path may be provided, such as adapting a lower level network for small data packets transmitted over short distances as compared to a higher-level network adapted for larger data packets at higher rates and for longer distances.

Figure 3:
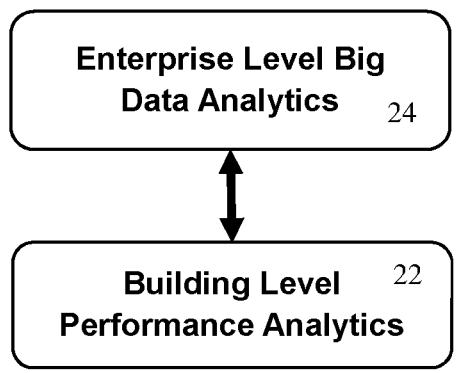
FIG. 3 illustrates an example distinction between building level and enterprise level analytics employed by a building analytics system of the management system.

In typical building automation, building performance is based on observed data from sensors and operation data from actuators. The enterprise 10 also generates enterprise level data. FIG. 3 shows analysis of these two sources or data, operational or building level analytics 22 and enterprise level analytics 24 that may be performed by the building analytics system 17 of the management system 10. While the building automation systems 12 may be diagnosed by the building analytics system 17 using building level performance analytics 22, less information is available and the impact on operation of the enterprise is not provided. By including or providing enterprise level analytics 24, the impact of building automation on the enterprise 10 may be determined or vise versa by the building analytics system 17 as further described in herein. Data analytics is used at an enterprise level by the building analytics system 17 for controlling the building automation systems 12. Meta data analysis by the building analytics system 17 for an enterprise may identify failures or other performance by type of building, time of day, and/or relationship to business information or other global data. The building analytics system 17 may employ such data analytics 24 in combination with performance analytics 23 to detect performance measures, such as budget expenditure for optimizing resource utilization and/or server scheduling within the enterprise 10.

Figure 4:
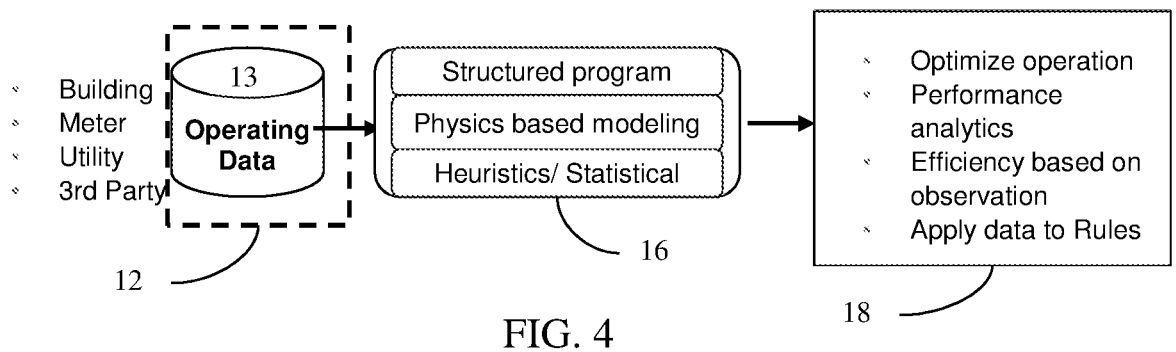
FIG. 4 shows one embodiment of building level analysis employed by the building analytics system.

FIG. 4 shows an example representation of the building level performance analytics 22 of FIG. 3 that may be employed by the building analytics system 17. Operating or operational data 13 from one or more building automation systems 12 that is received by the building analytics system 17 may include data from within the building, meter data, utility data, and/or third party (e.g., company providing HVAC services). A structured program, physics-based modeling, or heuristic or statistical based analysis by the processor 16 of the building analytics system 17 provides information on the display 18 and/or to be used for operating the respective building automation system 12. The information based on analysis is used to optimize performance, indicate performance, improve efficiency, or the use as feedback for controlling the building automation systems 12.

Figure 5:
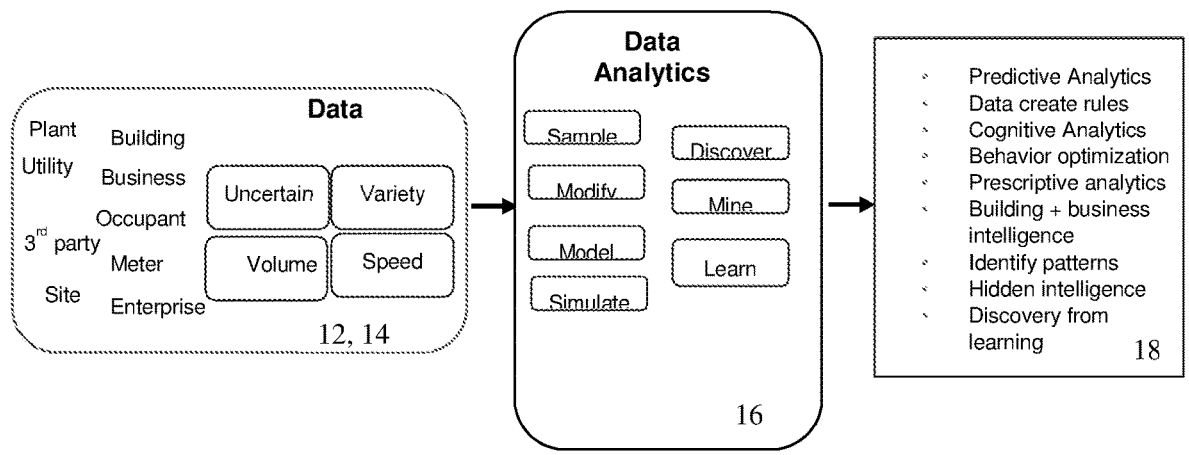
FIG. 5 shows an embodiment of enterprise level analysis employed by the building analytics system.

FIG. 5 shows an example representation of including both building level and enterprise level data in the analytics employed by the building analytics system 17. Operating data 13 from the building automation systems 12, such as the data discussed above for FIG. 4, is included with enterprise data from the database 14 that is accessible and received by the building analytics system 17. The enterprise data is building site data, occupant data, business data, or other meta data from the meta data database 14. The processor 16 applies data analytics to the converged data 13 and 14 from the business, building, plant, utility, third party, site, meter, enterprise, and/or other sources. The processor 16 may employ one or more types of analytics, including sampling, modifying, modeling, simulating, discovering, mining, and/ or learning. The analytics is used by the building analytics system 17 to predict, create rules, derive cognitive information, optimize behavior, prescribe, make decisions in building and business matters, identify patterns, find hidden information, or discover unknown relationships for output to the display 18 or to another device in the management system 18. Performance analytics may be gathered by the building analytics system 17 for the entire energy system within a building (e.g., as represented by a respective building automation system 12 in FIG. 1), within an entire enterprise 10, over a region, or in a collection associated with the enterprise 10 managed by the management system 8. The result is the building analytics system 17 generates converged data 13 and 14 and uses the converged data to employ analytics to create valuable knowledge and insights for the enterprise 10. The building analytics system 17 may use any of various sources of input data and building data with any of various data analytics to provide various information, such as control functions or a diagnosis of a potential fault for a building automation system 12 or other device within the enterprise 10.

In one embodiment, the data analytics employed by the building analytics system 17 includes correlating multiple variables represented in the data 13 and 14 with one or more performance criteria also represented in the data. Other sources of performance may be used. Any clustering or case based analysis may be used. By including data 13 from multiple building automation systems and/or enterprise data 14, this unsupervised learning by the building analytics system 17 may indicate useful information for diagnosis, prognosis, planning, or operation of systems or devices within the enterprise 10. Unsupervised learning employed by the building analytics system 17 determines the relationship of input variables or values of the variables to any user selected performance criterion or criteria without prior training of a classifier. The unsupervised learning indicates relationships based on data currently available without prior modeling or simulation.

Referring to FIG. 1, the building processor 16 and display 18 are part of a building analytics system 17. The building analytics system 17 extracts data included in the operational data 13 and/or enterprise data 14 that is obscured from the user to become viewable through a clustering process performed by the system 17 as described in detail herein.

The processor 16 is a computer, server, panel, workstation, general processor, digital signal processor, application specific integrated circuit, field programmable gate array, analog circuit, digital circuit, combinations thereof or other now known or later developed device for processing big data and determining the relationship of big data to building automation or vice versa. The processor 16 is a device for performing the data analytics, such as the unsupervised learning. The processor 16 is part of the enterprise 10. In one embodiment, the data analytics is performed by a management computer of a building automation system 12. Alternatively, the processor 16 is separate from the enterprise 10 to provide the data analytics as described herein as a service to the enterprise 10 by the building analytics system 17 as depicted in FIG. 1. For example, the building analytics system 17 may be a server in network communication with the building automation systems 12 and meta data database 14 of the enterprise 10 to perform the data analytics as described herein and then output control or other information to the enterprise 10 and/or different building automation systems 12 distributed in different buildings for control.

The processor 16 of the building analytics system 17 is configured to analyze the data, such as the building automation operation data 13 and/or the enterprise data 14. The data represents various variables. Values are provided for the variables. The values may be measures of the variable over time, by location (e.g., value for each building automation system), constant, or combinations thereof. For classification and clustering, bid data is pre-selected by the user or default bid data is used by the processor 16. The bid data represents variables of the operational and/or enterprise data. The bid data is used by the building analytics system 17 for the unsupervised learning.

The building processor 16 of the building analytics system 17 applies unsupervised learning to the data. The unsupervised learning as employed by the building analytics system 17 enables the processor 16 to determine a statistical or other relationship between the data without requiring a ground truth be provided by user or be a pre-determined requirement. Rather than train a classifier with one training set of data so that the resulting classifier is then applied to another set of data to classify, the unsupervised learning enables the building analytics system 17 to learn the relationship between data based on the data available at a given time or instance.

Any now known or later developed unsupervised learning may be used by the building analytics system 17, such as case-based reasoning or clustering. For example, the processor 16 of the building analytics system 17 is enabled to cluster the bid data using knowledge-based clustering, K-mean clustering, Kohonen's Self-Organising Feature Map (SOFM) algorithm, Self-Creating and Organising Neural Networks (SCONNs), or other clustering. The objects, such as building automation systems or other variables monitored by the building analytics system 17 within the enterprise 10, with similar values are grouped by the system 17. Any distance function for grouping or clustering may be used. Dense areas of data space, intervals, or statistical distribution may be used by the system 17 to cluster. Other multi-objective approaches may be used. The number of expected clusters may be user or approach defined. The relationship of the variables to the measure of performance may be iteratively extracted automatically by the system 17 or with user interaction with the system 17 via the interlace 19.

The unsupervised learning employed by the building analytics system 17 determines the relationship between one or a set of variables or values to another one or set of variables or values. In one embodiment, one or more variables are selected by the building analytics system 17 as performance criterion or criteria. The values of the variables are used as a measure of performance. The variable representing performance may be from the operational data 13 or may be from the enterprise data 14. In one example using the operational data, the variable is chiller efficiency. In another example using enterprise data, the variable is employee performance, building operational budget, or cost of operation of a component or all of the building automation. Any source of building performance may be used by the building analytics system 17, such as the service budget or user complaints.

The variables are used by the building analytics system 17 to cluster relative to the performance in order to determine which variables or values of variables distinguish between good and bad performance. Combinations of variables and the associated values may be employed by the building analytics system 17 to distinguish or correlate more strongly with the performance. The good and bad performances are relative terms based on the range of values for the performance measure. A default or user selected delineation between good and bad performance may be used. Alternatively, the clustering or other unsupervised learning employed by the building analytics system 17 applies a standard deviation or other analysis to distinguish between good and bad performance.

In one example, clustering is used by the building analytics system 17 to measure building performance. The operational data 13 of the building automation systems and/or enterprise data 14 are clustered by the building analytics system 17 to determine whether the building automation systems 12 are operating as desired. In another example, data analytics are used by the building analytics system 17 to measure performance of the enterprise, business unit, employee, customer, or other enterprise-related group. The operational data of the building automation systems and business data from a business controlling the multiple buildings are clustered by the building analytics system 17 to determine whether the building automation systems 12 are impacting the enterprise.

The unsupervised learning employed by the building analytics system 17 finds patterns, behavior, family, clustering, classifications, or other grouping of factors correlating with the performance. In one example, the enterprise 10 is a school system with many buildings for schools. In this example, student performance is used as the measure of performance. This enterprise data may be test scores, grades, or other information available as meta data 14 for access by the building analytics system 17. Any or all of the operational variables of the building automation systems 12 for this school system enterprise 10 may be analyzed by the building analytics system 17 to determine correlation with or degree of influence on the performance measure. In this example, the clustering as identified by the building analytics system 17 in accordance with embodiments disclosed herein may indicate that the classroom ventilation directly impacts student performance given other variables remaining the same. The group of buildings with poorer ventilation may be identified by the building analytics system 17 as a cluster.

The other variables or values may impact performance, but to a lesser degree, as determined by the building analytics system 17. Based on the identified clusters, the building analytics system 17 is able to determine whether one group of variables or values is impacting performance more substantially than others. Based on pre-selected criteria, such as correlation ranking, the cluster results are ranked by the building analytics system 17 for the user to choose and use. For example, the level of influence, correlation coefficient, or relative impact is used by the building analytics system 17 to distinguish between the variables or value range influence on the performance.

Figure 6A:
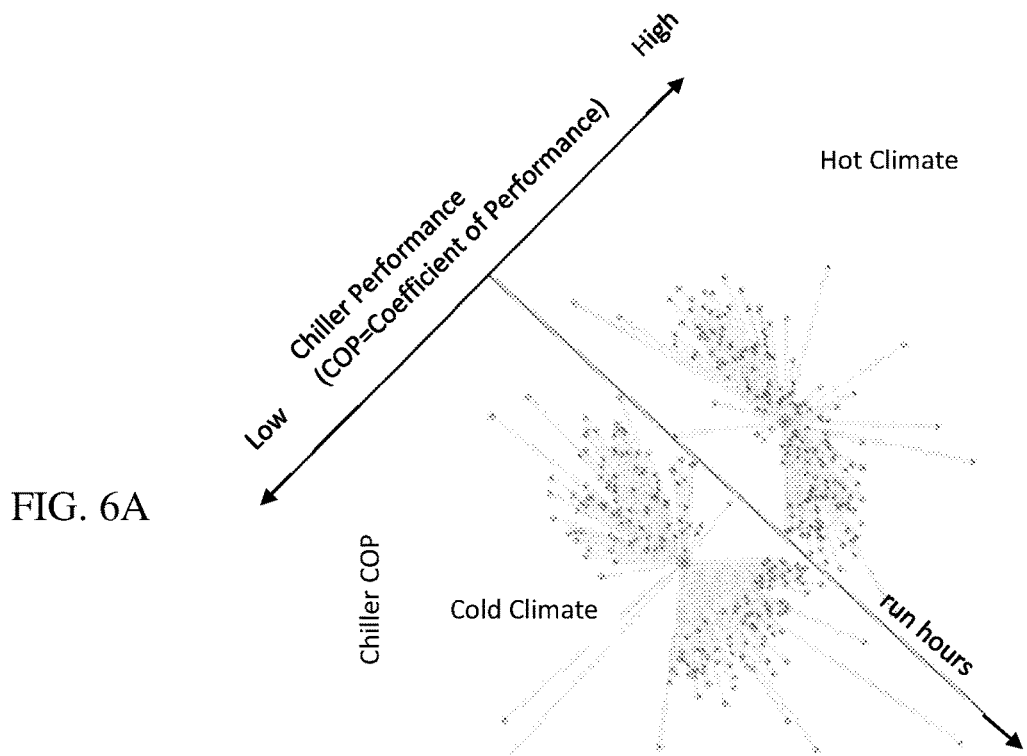
FIGS. 6A and 6B show example clustering with case based reasoning employed by the building analytics system.

FIG. 6A shows an example of clustering performed by the building analytics system 17 in a chiller performance example. Weather data, age of chiller controlled by a respective building automation system 12, type of chiller and geographic location from a large number of buildings (e.g., 50 buildings) are selected as input variables to the building analytics system 17. The processor 16 applies clustering to determine the relationship or correlation of the various input variables to the chiller performance, here measured as coefficient of performance. Each dot in the cluster represents one of the chillers. Performance is mapped by the processor 16 to the y-axis and run hours are mapped to the x-axis. The cluster in the upper right is associated by the processor 16 with performance in hot climates and the cluster in the lower left is associated by the processor 16 with cold climates. The climate (e.g., combination of weather data and location) is a third dimension use for clustering along the y and x-axes in case based reasoning by the processor 16 of the building analytics system 17. For case based reasoning, the processor 16 of the building analytics system 17 enables the user to select or identify (via keyboard or other input means through the interface 19) the clustering variable (e.g., climate), x-axis, and/or y-axis variables to be used. The processor 16 may also perform clustering as described herein using various combinations without user selection to identify the combination with the greatest or group of combinations with a threshold correlation. Other input variables may have less correlation with chiller performance, so the processor 16 may identify such other input variables as not determinative. Based on the clustering indicating a correlation as determined by the processor 16, the design, maintenance, or replacement of the chiller for some buildings may be handled separately from others, such as based on climate in accordance with the determined clustering correlation. This case based reasoning employed by the building analytics system 17 may be used to improve the chiller performance or other variable used for clustering.

Figure 6B:
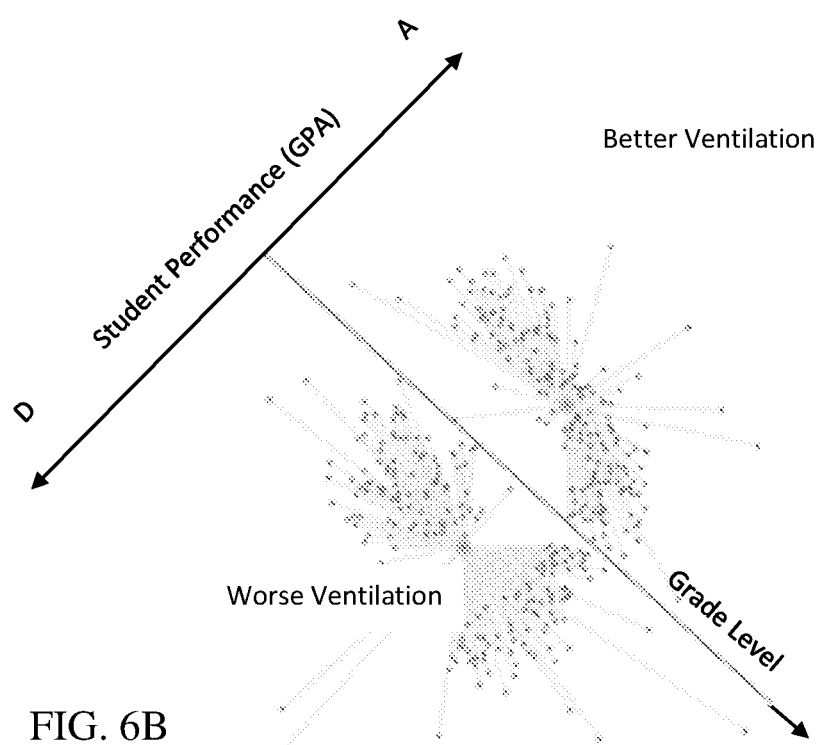

FIG. 6B shows an example of clustering performed by the building analytics system 17 in the student performance example of case based reasoning with clustering. Space $CO_2$, ventilation, geographic location, type of distribution (e.g., water or air), age of a respective building automation system, mechanical system, and weather are selected as the input variables to the building analytics system 17, but other variables may be used. The processor 16 applies clustering (e.g., unsupervised learning) to determine the relationship or correlation of the various input variables to the student class performance (e.g., grade point average (GPA)). Each dot in the cluster represents a student. Performance (e.g., GPA) is mapped by the processor 16 to the y-axis and grade level is mapped to the x-axis. The cluster in the upper right is associated by the processor 16 with better ventilation and the cluster in the lower left is associated by the processor 16 with poor ventilation. The ventilation is a third dimension use for clustering along the y and x-axes in case based reasoning by the processor 16 of the building analytics system 17. For case based reasoning, the processor 16 of the building analytics system 17 enables the user to select or identify (via keyboard or other input device through the interface 19) the clustering variable (e.g., ventilation), x-axis, and/or y-axis variables to be used. The processor 16 may also cluster using various combinations without user selection to identify the combination with the greatest correlation or group of combinations with a threshold correlation. Other input variables may have less correlation with student performance, so the processor 16 may identify such other input variables as not determinative. Based on the clustering indicating a correlation as determined by the processor 16 in accordance with the embodiments disclosed herein, the building analytics system 17 may determine which buildings have poor ventilation for the school system enterprise 10. By improving the ventilation, student performance should increase.

In one embodiment, different types of unsupervised learning are applied by the building analytics system 17 in the management system 8 to the same data with the same performance criterion or criteria. For example, different types of clustering are applied by the building analytics system 17 such that the results from the different types of clustering (e.g., correlation coefficients of each variable to a given performance criterion) are averaged, weighted averaged, or otherwise combined by the building analytics system 17. Probability distributions may also be combined. In other embodiments, the results from the different types of clustering are automatically selected by the building analytics system 17 based on a pre-defined ranking. For example, the user pre-selects a ranking criterion or criteria, such as correlation ranking. The results from the different types of clustering are ranked by the building analytics system 17 for the user to choose and/or use. The higher N ranked results are selected by the processor 16 automatically, where N is an integer of 1 or higher.

Figure 7:
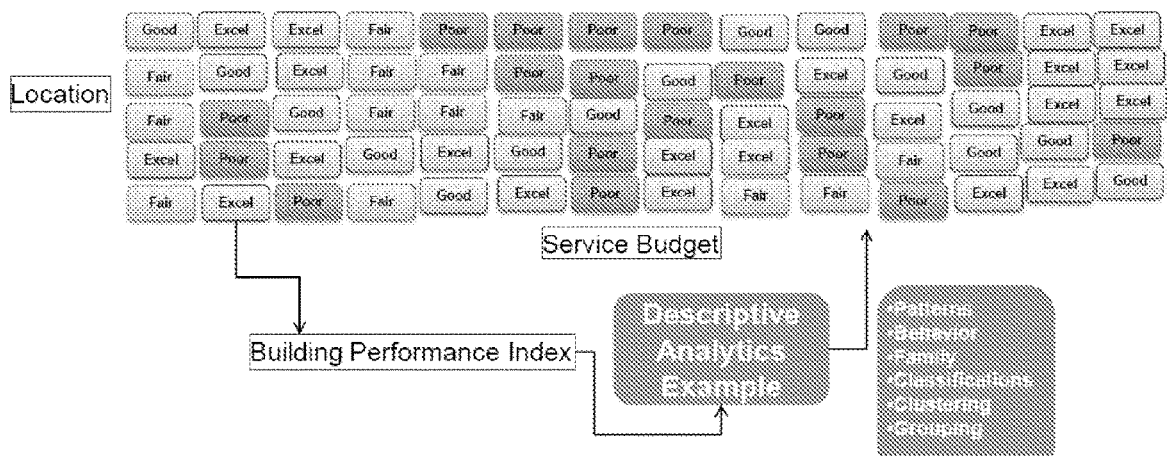
FIG. 7 illustrates one embodiment of cluster analysis using enterprise data employed by the building analytics system.

FIG. 7 shows another example of cluster analysis using enterprise data 14 that is employed by the building analytics system 17. In FIG. 7, each "good," "excel," "fair," and "poor" box represents a location. The building performance index or criterion is the service budget. The service budget is accessed by building analytics system 17 from the enterprise data. To find a pattern, clustering, family identification, or grouping is used by building analytics system 17. For example, the building analytics system 17 may employ clustering to identify that the number of open maintenance positions correlates with the performance of the building automation system 12 related to the service budget for the associated building automation system 12. The data is classified with unsupervised learning by the building analytics system 17 to determine enterprise level behavior resulting in the service budget level. The clustering may by the building analytics system 17 in the management system 8 for the enterprise 10 to additionally or alternatively determine commonalities of location associated with the performance, such as identifying that buildings in the enterprise 10 near large bodies of water are clustered relative to buildings spaced from water.

In one embodiment, the processor 16 of the building analytics system 17 applies unsupervised learning to identify sub-sets of building automation systems 12. The sub-set may be of underperforming systems 12 or systems 12 with optimal or sub-optimal performance. For example, in this embodiment, the processor 16 is able to identify a correlation of the operational and/or enterprise data with a measure of building automation performance to then identify both the buildings and variables for those buildings associated with the poor performance. In a banking enterprise example, the building analytics system 17 in accordance with disclosed embodiments, may identify one chiller or chillers in the banking enterprise 10 not performing equally across climatic regions. Chiller operation and location may be identified by the building analytics system 17 in a cluster of the poor performing buildings within the enterprise 10. As a result of performing clustering as disclosed herein, the banking enterprise may alter the design of the chillers in some regions of the enterprise 10 without suffering the cost of replacing chillers in all regions.

Enterprise data (e.g., meta data, service records, utility data, business data, and/or budget information), building data (e.g., age and/or location), systems data (e.g., type of distribution system—water and/or air), application data (e.g., building sensor and/or operations data), and/or other types of data are analyzed by the building analytics system 17 in accordance with disclosed embodiments, such as analyzed for building performance, enterprise performance, or other factor. The different buildings being controlled in an enterprise 10 by a respective building automation system 12 in communication with the building analytics system 17 may be rated by the system 17 for performance using different criteria and/or sources of data. The data is used by the system 17 to find insight into the performance and/or control to optimize performance or diagnose building automation or enterprise performance. The enterprise data is used as input variables and values related to performance and/or as the performance.

Figure 8:
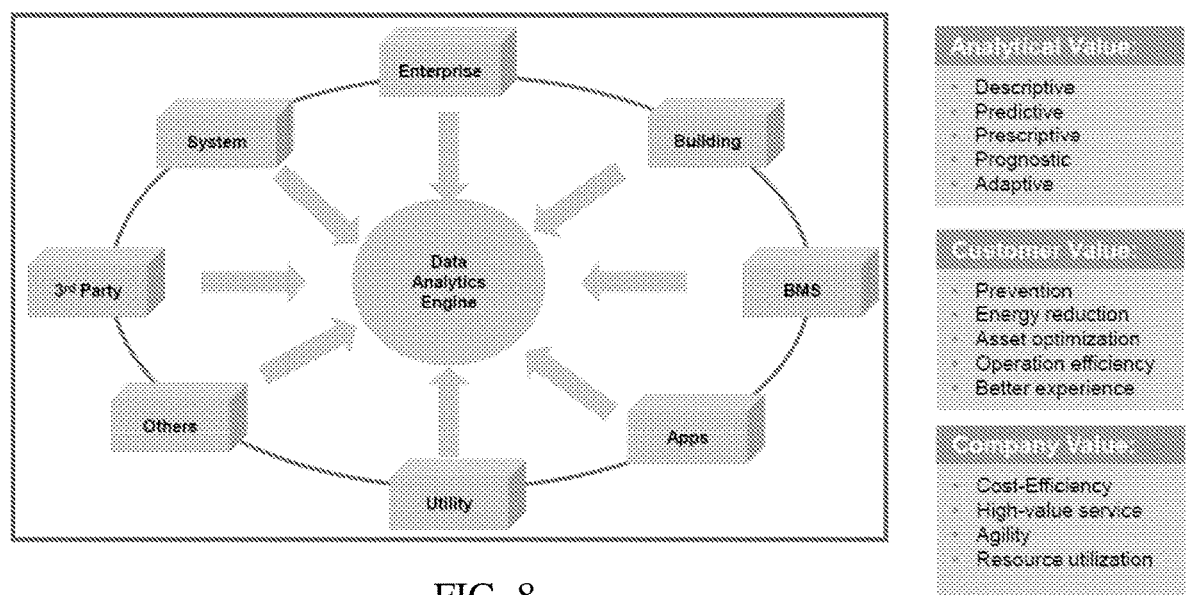
FIG. 8 is an example data representation for cluster analysis at an enterprise level employed by the building analytics system.

FIG. 8 is another representation of this overall approach employed by the building analytics system 17 to use data with unsupervised learning in building automation. Enterprise data, building automation system data (e.g., which may be part of operational data 13), data from third parties (e.g., weather or operation information from a service), utility data (e.g., rates), building data (e.g., location and size), building management system (BMS) data (e.g., which may be part of operational data 13 and/or include building asset tracking data that is not part of operational data 13), application data (e.g., specific operational data pertaining to a corresponding application of a building automation system 12, BMS or other building controller), and/or other data is analyzed by the building analytics system 17 using unsupervised learning as part of a data analytics engine implemented by the building analytics system 17 as shown in FIG. 8. This learning may be descriptive, predictive, prescriptive, prognostic, or adaptive for each of the building automation systems 12 and/or the enterprise 10. The learned relationships identified by the building analytics system 17 in accordance with the embodiments disclosed herein may be used to prevent problems, reduce energy usage, optimize assets, increase efficiency, and/or provide better experience. The analysis is provided by the building analytics system 17 as network component of the enterprise 10 or as a remote service for the enterprise 10 to assist the enterprise in cost efficiency, valued service, agility, and/or resource utilization. Relationships between any variables and any performance may be provided to the building analytics system 17 employing the clustering analytics embodiments disclosed herein. By analyzing big data, large amounts of variables, a broad range of values, or variables with measures over many samples (e.g., many buildings), the building analytics system 17 may use clustering to identify unexpected relationships and/or hypotheses for improving performance within the associated enterprise 10.

Figure 9:
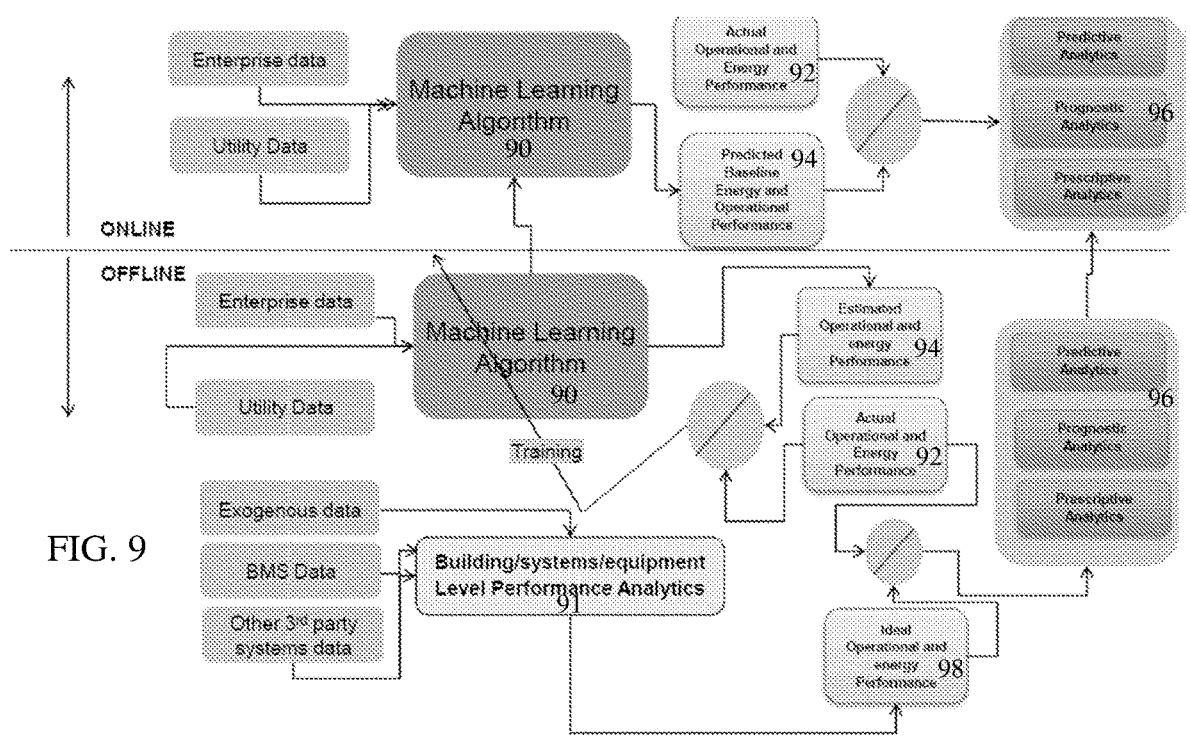
FIG. 9 is one embodiment of a block diagram representing machine learning using enterprise data employed by the building analytics system.

Other types of machine learning may be used by the building analytics system 17 in addition to or instead of unsupervised learning. Rather than clustering or case-based reasoning, a machine learnt classifier employed by the building analytics system 17 may be trained to diagnose operation of the enterprise and/or building automation system using both building automation data and enterprise data. FIG. 9 represents an example. In an offline process, the building analytics system 17 trains a classifier 90 using enterprise data, utility data, and/or other data. The classifier 90 is trained to estimate 94 operational and/or energy performance. Other performance measures may be used. In a feedback or online learning approach, the training employed by the building analytics system 17 may include comparison of estimated 94 verses actual 92 performance. Using this process, the building analytics system 17 continues the training until a desired accuracy is reached.

Exogenous data, building management system data, other third party data, and/or other data is analyzed by the building analytics system 17 for performance 91. This data analytics by the building analytics system 17 may yield an ideal or desired performance 98, such as using clustering to identify the characteristics (e.g., values) for correlated variables of buildings with better performance. The building analytics system 17 compares this desired performance 98 with the actual performance 92. Using predictive, prognostic, and/or prescriptive analytics 96, the comparison by the building analytics system 17 may trigger an upgrade, change, or retraining of the online predictor or trained classifier.

Once trained, the machine-learnt classifier 90 employed in the building analytics system 17 receives the input feature vector from the enterprise, utility, or other data to predict performance 94. The predictive performance 94 may be compared by the building analytics system 17 to actual performance 92 for use in other various analytics 96. The output of the machine-learnt classifier 90 may be used in clustering processes performed by the building analytics system 17, such as relating predicted performance 94 of the energy or operation of the building automation to an enterprise performance variable. Clustering as employed by the building analytics system 17 may be used to derive an input for the input features vector of the machine-learnt classifier 90.

Figure 10:
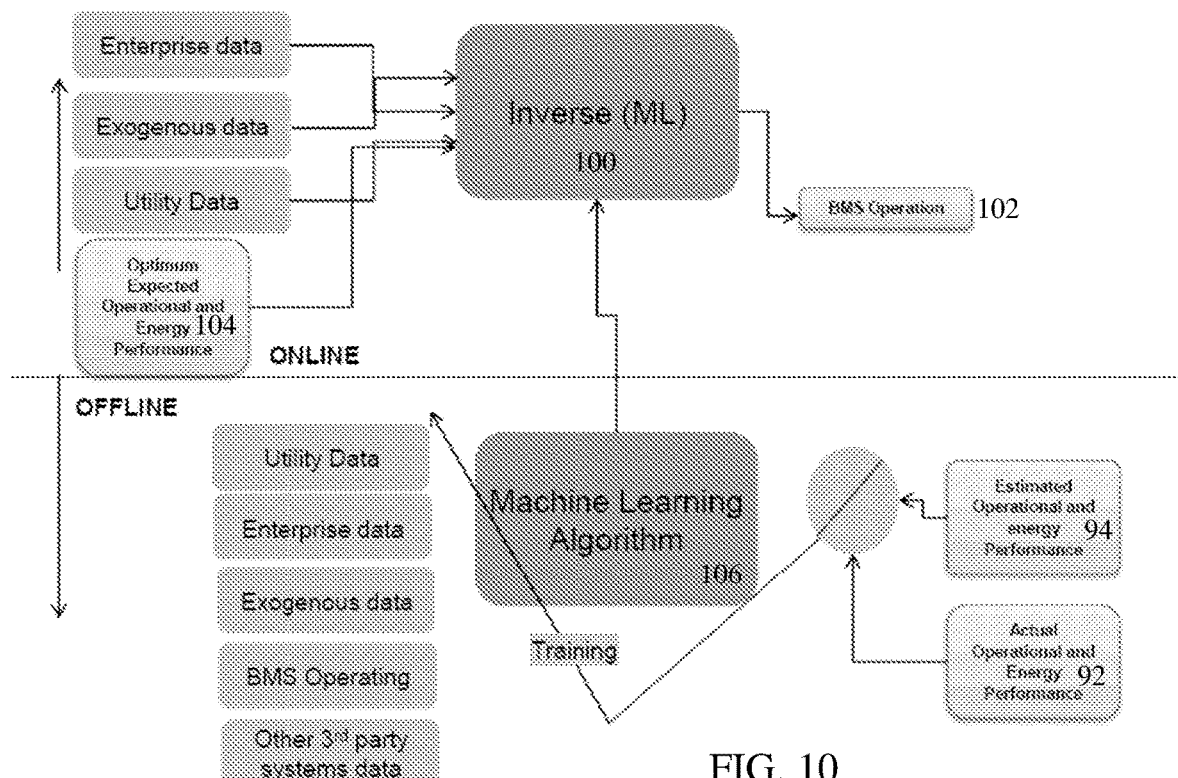
FIG. 10 is an embodiment of a block diagram of use of machine learning employed by the building analytics system to control building automation systems within the enterprise.

In another embodiment represented in FIG. 10, an inverse machine-learnt classifier 100 is employed in the building analytics system 17. In this embodiment, the building analytics system 17 trains the classifier 100 to use various data to predict performance 94 based on actual performance 92. Some of the data used as an input to the training of the machine-learnt classifier 106 includes building automation data, such as set points, operation sequence, operating ranges, or other control information. The inverse machine learnt classifier 100 of the machine-learnt classifier 106 may convert desired performance 104 into building management system operation parameters 102 (e.g., set points, sequence of operations, and/or operation range). Enterprise and building automation operational data are used in the training and inversion.

The data to be used for training and inversion may be determined by clustering employed by the building analytics system 17 in accordance with the embodiments described herein. The variables most determinative of the desired operation or energy performance 104 are determined by clustering pre-process by the building analytics system 17.

Returning to FIG. 1, the display 18 is a liquid crystal display, light emitting diode display, CRT, monitor, plasma, projector, printer, or other display. The display 18 is configured by the processor 16 to present results of the unsupervised learning as employed by the building analytics system 17. In one example, a cluster graph generated by the processor 16 such as shown in FIG. 6 in accordance with the embodiments disclosed herein is output to the display 18. As another example, diagnosis of the effects of various variables on performance is output by the processor 16 to the display 18. The statistics, correlation, or other clustering results may also be output. In yet another example, the processor 16 outputs to the display 18 the identifications of the buildings or building automation systems 12 identified by the building analytics system 17 as suffering from a problem as a result of clustering performed in accordance with the embodiments disclosed herein. Clusters or membership in a cluster are also presented by the processor 16 to the display 18 for observation by the user.

In other embodiments, the processor 16 transmits results for use in control or other uses. The building automation systems 12 may be controlled to increase performance, such as by identifying and fixing factors associated with poor performing buildings in light of better performing buildings. For example, a grouping of systems associated with a given technician performing poorly indicates a need for training of the technician. The processor 16 outputs the link with the technician on the display 18, outputs a message to a supervisor, or outputs a calendar event for training.

Figure 11:
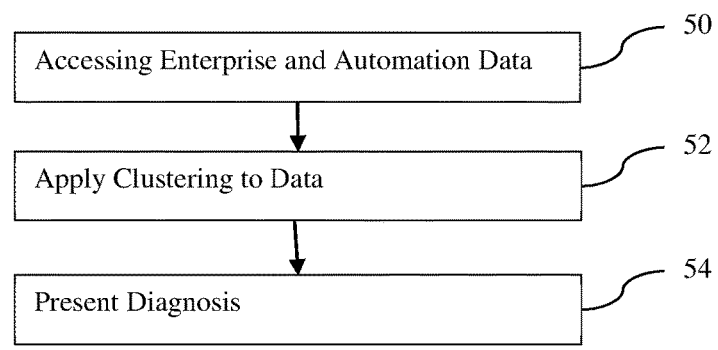
FIG. 11 is a flow chart diagram of one embodiment of a method employed by the building analytics system in the management system for building automation diagnosis.

FIG. 11 shows one embodiment of a method for building automation diagnosis in a building management system. The method is implemented using the management system 8 of FIG. 1 or a different system.

Additional, different or fewer acts may be provided than shown in FIG. 11. For example, act 54 is not performed, but instead a transmission, storage, or rule-based action occurs using the diagnosis or results of the clustering.

In act 50, a processor accesses data related to a plurality of buildings. The access is by receipt of information, request of information, or loading information. Multiple memories may be mined by the processor in the management system 10 related to multiple building automation systems in an enterprise. In alternative embodiments, data related to a single building is accessed.

The data includes building management system or building automation system operational data and enterprise data different than the building management system or building automation system data. The building automation systems in the enterprise and in communication with the building management system generate data specific to the building automation. For example, actuator settings, sensor readings, set points, meter information, weather, utility information, or other data for the daily operation of the respective building automation system are accessed. The building management system includes automation for heating, cooling, ventilation, fire safety, or combinations thereof data.

The enterprise generates data specific to the business of the enterprise. The business of the enterprise is not automation of the buildings. Instead, budget, maintenance, employee complaint, or human resources data of the enterprise is accessed.

The enterprise data is accessed in an enterprise database. The enterprise database is one or more memories organized as one database or as separate data structures. The enterprise data representing one or more variables is accessed. The values for a given variable may be the same or different across the multiple buildings. For example, the maintenance budget for the building is associated with the multiple buildings but may or may not be different for different buildings. The amount of deviation from the budget is more likely to be different for different buildings.

The data to access may be all available data in the enterprise database and/or operational data stored by each building automation system. Alternatively, a user indicates the data to access. The user configures the analysis by indicating the performance measure or measures and the input variables or data to relate to the performance measures. In other embodiments, a specific performance is not indicated. Instead, the relationship of each or groups of variables or values to each other are determined by the processor.

In act 52, a processor applies unsupervised machine learning to the first data. Some of the data is designated as a measure of performance of building management systems of the buildings of the plurality or of the enterprise by building. Performance that is not building specific may instead be used.

The unsupervised learning is performed without prior training of a classifier. The machine learning determines a diagnosis of the input data without training using training data and a ground truth. Instead, the relationship of the variables or values with each other is determined by the processor. The acts of FIG. 11 are performed without prior training.

In one embodiment, the unsupervised machine learning is clustering. The performance of the building management system is used to cluster other data, such as enterprise data. The performance of the enterprise may be used to cluster enterprise and/or building management system or building automation system data. Any variable or variables from the enterprise or automation system operation may be designated as the measure of performance and/or the input variables to be clustered. Any clustering approach may be used. More than one clustering approach may be used, such as clustering using different approaches and combining the outcomes from the different approaches into a given result set.

The clustering identifies commonalities of the input variables or of the values of the input variables with the measure of performance. Different variables or values of the enterprise and/or operation data are statistically related (e.g., correlated) to the performance. A probability distribution of the variable or variables to the measure of the performance and/or of the values of the variables to the measure of performance are calculated by the processor.

The clustering or unsupervised learning in the management system may identify variables that impact the performance. The range of values of the variables associated with worse or better performance may be determined by the processor. Where different values are provided for different buildings, then a sub-set of buildings or building management systems associated with or having poorer performance may be identified.

In act 54, the processor outputs results of the application of unsupervised learning to a display, network, memory, or other processor. The relationships between different variables and performance, between the variables with each other, or values with performance are output. A component, such as a variable, group of variables, or range of values, more strongly related to performance than other tested variables is output. Any threshold or user selected division of the amount or degree or relation may be used to distinguish one cluster from another. The cluster represents a commonality of the values of the variable or variables for a sub-set of the buildings. The cluster or clusters associated with lesser performance as well as the related variables or values of the variables are output. A probability distribution or other statistical information representing the relationship may be output. For example, the results of the clustering are presented to the user for diagnosis. Problems or relationships may be found and used to improve performance.

The clustering or unsupervised learning may indicate a sub-set of buildings associated with poor performance. The identity of the buildings associated with values clustered as related to performance may be output. The characteristics of the buildings (e.g., values and/or variables associated with poor or better performance) may also be output. Different building sub-sets may have different variables in the cluster leading to the poor or good performance, so the cluster information may be used to identify the buildings to be emulated or fixed and differences between clusters leading to the success or poor performance.

The output component may include one or more values and/or variables from enterprise data. This information may be used to alter how the enterprise acts to prevent poor performance of the building management system or vise versa.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method of building automation diagnosis in a building management system, the method comprising:
   accessing first data related to a plurality of buildings by a building analytics system of the building management system, the first data including building management system data and enterprise data different than building management system data, the enterprise data for an enterprise associated with the buildings of the plurality and the building management system data being for the buildings of the plurality;
   applying, by the building analytics system, the first data to unsupervised machine learning with a measure of performance for case based reasoning; and
   outputting, as a result of the applying, at least one component of the first data indicative of poorer measures of the performance of the building management system identified in the first data, the at least one component including the enterprise data,
   wherein the accessing, applying, and outputting are performed without prior training of the unsupervised machine learning.

2. The method of claim 1 wherein accessing the enterprise data comprises accessing budget, maintenance, employee complaint, or human resources data of the enterprise.

3. The method of claim 1 wherein accessing the building management system data comprises accessing heating, cooling, ventilation, fire safety, or combinations thereof data.

4. The method of claim 1 wherein applying comprises clustering.

5. The method of claim 4 wherein clustering comprises identifying commonalities of the first data correlated with the measure of the performance.

6. The method of claim 1 wherein applying comprises applying with the measure of performance being from the enterprise data.

7. The method of claim 1 wherein outputting comprises outputting the at least one component as data correlated with the poorer measures of performance.

8. The method of claim 1 wherein outputting comprises outputting the at least one component as identification of a sub-set of the buildings correlated with the poorer measures of the performance.

9. The method of claim 1 wherein applying comprises calculating probability distribution of the first data to the measure of the performance.

10. A building management system for building automation diagnosis, the system comprising:

building automation systems for heating, ventilation, and air conditioning, the building automation systems being for multiple buildings and configured to output operational data;

a building processor configured to apply unsupervised machine learning to the operational data of the building automation systems and to identify a sub-set of the building automation systems based on the operational data onto which said unsupervised machine learning is applied; and a display configured to output the identification of the sub-set, wherein said unsupervised machine learning is unsupervised machine learning without prior training.

11. The building management system of claim 10 wherein the building processor is configured to cluster the operational data of the building automation systems and business data from a business controlling the multiple buildings.

12. The building management system of claim 10 wherein the building processor is configured to determine correlation of the operational data to the sub-set, and the display is configured to output the correlation.

13. The building management system of claim 10 wherein the building processor is configured to perform clustering based on a measure of performance, the measure of performance comprising a variable of the building automation systems.

14. The building management system of claim 10 wherein the building processor is configured to perform clustering using multiple clustering approaches and combine results from the multiple clustering approaches.

15. A method for building automation diagnosis in a building management system, the method comprising:

accessing, by a building analytics system of the building management system, enterprise data in an enterprise database, the enterprise data related to one or more buildings, the enterprise data being other than building management system data;

clustering, by the building analytics system, for performance of a building management system with the enterprise data; and presenting on a display of the building analytics system, results of the clustering, the results including a relationship of the enterprise data to operation of the one or more buildings identified by the clustering, wherein the accessing, clustering, and presenting are performed without prior training of the unsupervised machine learning.

16. The method of claim 15 wherein clustering comprises applying unsupervised machine learning.

17. The method of claim 15 wherein clustering comprises correlating different variables of the enterprise data to the performance, and wherein presenting comprises identifying a sub-set of the variables more strongly correlated with the performance.

18. The method of claim 15 wherein the one or more building comprises multiple buildings, and wherein clustering comprises identifying a sub-set of the multiple buildings.

19. The method of claim 15 wherein clustering comprises clustering using different approaches; and combining outcome from the different approaches into the results.

20. The method of claim 15 wherein clustering comprises clustering using different approaches; and further comprising selecting the results of at least a first of the different approaches based on a ranking.

* * * * *